Figure 3:
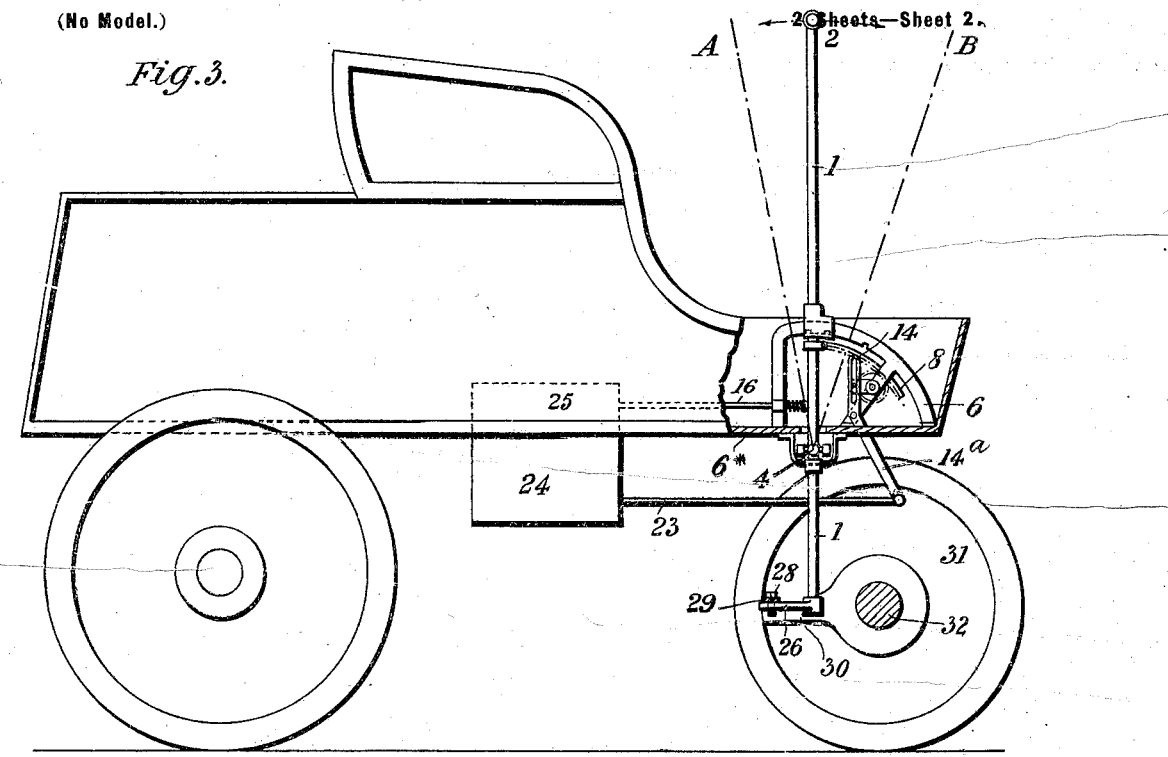

No. 627,201. Patented June 20, 1899.
A. PAGET.
SPEED REGULATING, STARTING, STOPPING, REVERSING, AND STEERING MECHANISM FOR MOTOR VEHICLES.
(Application filed Mar. 23, 1897.)
(No Model.) 2 Sheets—Sheet 1.
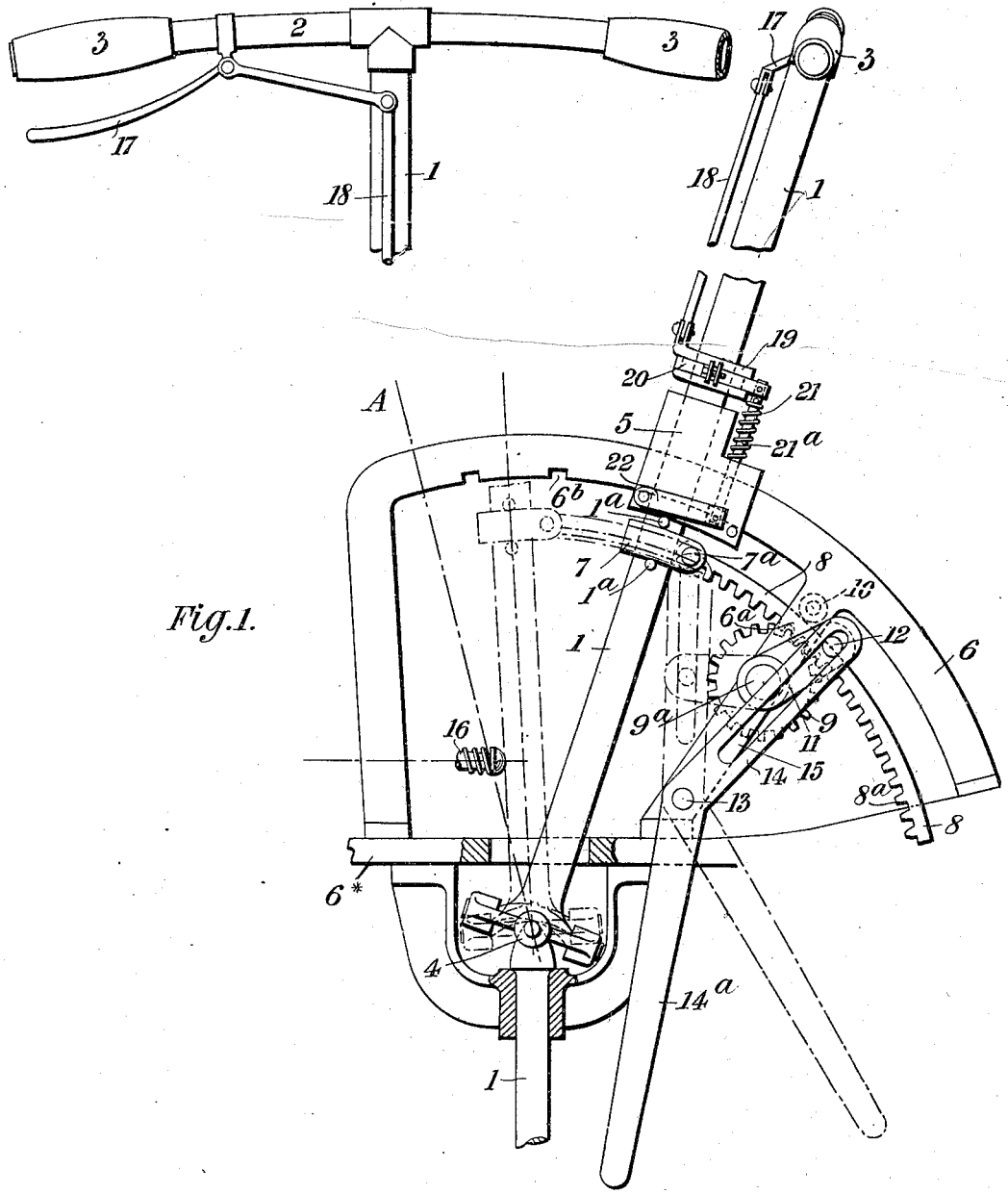

No. 627,201. Patented June 20, 1899.
A. PAGET.
SPEED REGULATING, STARTING, STOPPING, REVERSING, AND STEERING MECHANISM FOR MOTOR VEHICLES.
(Application filed Mar. 23, 1897.)
(No Model.) 2 Sheets—Sheet 2.

WITNESSES:
Fred White
Thomas F. Wallace

INVENTOR:
Arthur Paget,
By his Attorneys

United States Patent Office.

ARTHUR PAGET, OF LONDON, ENGLAND.

SPEED-REGULATING, STARTING, STOPPING, REVERSING, AND STEERING MECHANISM FOR MOTOR-VEHICLES.

SPECIFICATION forming part of Letters Patent No. 627,201, dated June 20, 1899.

Application filed March 23, 1897. Serial No. 628,823. (No model.)

*To all whom it may concern:*

Be it known that I, ARTHUR PAGET, of London, England, have invented certain new and useful Improvements in Speed-Regulating, Starting, Stopping, Reversing, and Steering Mechanism for Motor-Cars, Launches, and the Like, (for which I have obtained a patent in Great Britain, No. 8,596, bearing date April 23, 1896, and in France, bearing date October 23, 1896, and numbered 260,660,) of which the following is a specification.

My invention has reference to speed-regulating, starting, stopping, reversing, and steering mechanism for motor-cars, launches, and the like when fitted with electric or other motors as the propelling or driving power.

It has in practice been found difficult to design speed-regulating, starting, stopping, reversing, and steering mechanism both rapid in action and easy of manipulation. The ideal arrangement is one in which the actuation of such mechanism is effected altogether instinctively on the part of the person driving. I attain this object according to the present invention by means of a combined power-regulating and steering device comprising a head mounted on a shaft, which not only can be turned on its axis like the steering-head of a bicycle, so as to steer the car, launch, or the like, but can also be moved backward and forward, so as to start, stop, reverse, and regulate the speed of the car, launch, or the like, the driver acting practically just as in driving a horse. Angular displacement or rotation of the head for the purpose of steering may be made to produce an equal or a lesser angular displacement of the plane of the steering-wheels, according to circumstances. The arrangement of the parts is preferably such that when the shaft and steering-head are in, say, the middle position the power is entirely switched or turned off. When the steering head and shaft are pushed forward, the power is applied to drive the car, and when the steering head and shaft are pulled back behind the middle position the power is reversed, while any desired amount of power less than the full power may be obtained by moving the steering-head proportionately away from the middle position forward for driving and backward for reversing. In cases where it may not be required to provide for reversing the most backward position of the steering head and shaft may be that which switches or turns off the power.

The device which is intended to be operated by means of the steering-head in order to regulate or control the power may, according to the particular power employed, consist of any mechanisms whereby the variations of motion of the car or the like from rest to the various degrees of motion in either direction may be substantially controlled by the to-and-fro movement of a single connecting-rod or its equivalent—for example, either of an electric resistance - switch and reversing-switch or of a four-way plunger-valve—so as to control the direction and amount of the flow of a fluid in a hydraulic or other motive-fluid circuit, or of jockey-pulleys in combination with running belts, or of the rod controlling the moving part of any variable-power device, or of any friction or positive driving clutch gear.

The steering of the car, launch, or the like by means of the rotary motion of the steering-shaft about its own axis may be effected by a separate connecting-rod or its equivalent operating, according to circumstances, either by direct action upon the wheel-axle, as in a bicycle, or through the intermediation, for example, of a lever or a rack and pinion connected to an under carriage or to separately-pivoted wheels, or by means of a rack and pinion, lever, or other device acting on a plunger-valve, or in case of launches by means of chains connected with the rudder.

In the cases where the gearing of the steering-wheel is such that the requisite movement is obtained by means of an angular movement of the steering-head not exceeding one hundred and eighty degrees I preferably use an ordinary bicycle handle-bar. Where it is necessary to move the steering-head through a greater angle than one hundred and eighty degrees, I construct the steering-head in the form of a horizontal wheel.

In order to avoid any liability of the steering-head being unintentionally moved to or fro while turning it, a locking device may be provided similar to that used for locking railway signal-levers or for the reversing-levers of engines, operated in the case of a bicycle handle-bar by means of a handle similar to that of a bicycle-brake and in the case of a horizontal wheel by a second horizontal wheel directly under the first and mounted on a sliding collar connected to the locking device, so that by raising the lower wheel the locking device is released.

With the object of enabling my invention to be readily understood I shall proceed to describe the same more fully with reference to the accompanying drawings, which represent one manner in which it may be carried into effect for the purpose of controlling the steering and regulation of an electric carriage.

Figure 4:
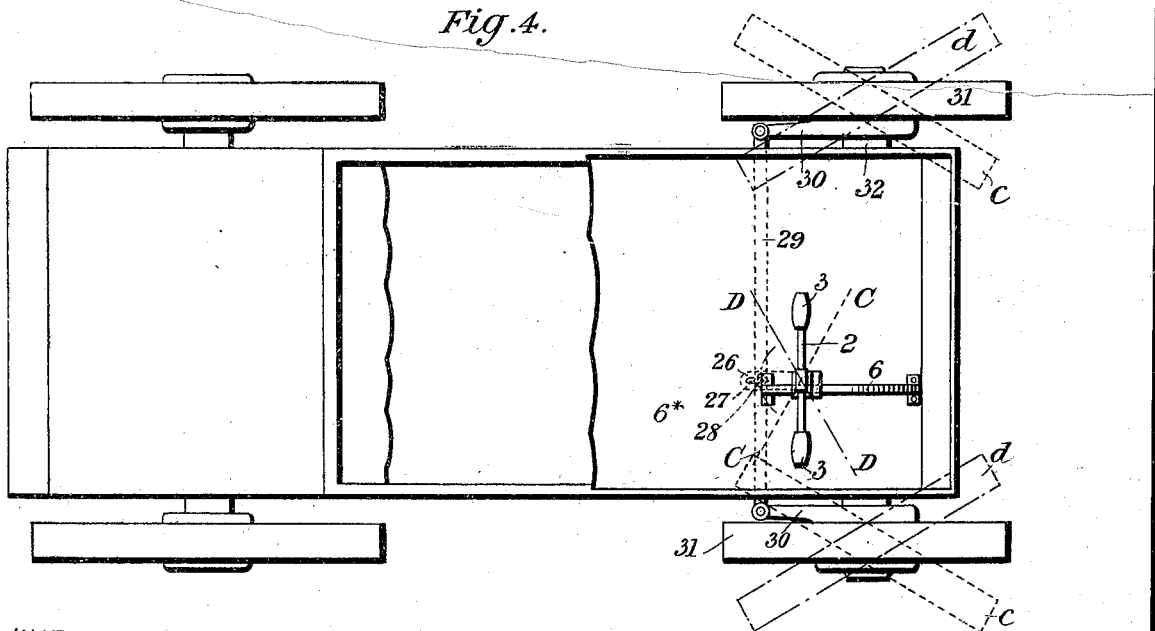

In the drawings, Figure 1 is a side elevation of as much of the mechanism as is necessary to enable the invention to be understood, and Fig. 2 is a front elevation of the steering-handle with a portion of the connected parts. Figs. 3 and 4 are respectively a side elevation, partly in section, and a plan of a motor-car fitted with my speed-regulating, starting, stopping, reversing, and steering mechanism. Fig. 3 is more particularly intended to show the speed-regulating, starting, stopping, and reversing mechanism. Fig. 4 is more particularly intended to show the mechanical connections between the steering-head and the wheels of the car. For this reason some of the parts shown in Fig. 3 have been omitted in Fig. 4 for the sake of clearness. Figs. 3 and 4 are drawn to a smaller scale than Figs. 1 and 2.

The vertical or approximately vertical shaft 1 of the steering head or part 2, which carries the steering arms or handles 3 3, has a universal joint 4 at or near its lower end, so that it can be turned on its axis in order to steer the car—as in steering a bicycle, for example—and can also be moved forward and backward. The said shaft 1 is capable of rotating freely in a sliding piece 5, which may, if necessary, be fitted with ball or other antifriction bearings for the shaft. This piece 5 is, together with the shaft 1, free to be moved backward and forward along a fixed guide 6. This guide 6 is curved to an arc of the circle described from the center of the universal joint 4 and is preferably fixed to the casing 6*, which incloses more or less of the several parts of the apparatus, as desired, and also serves to provide the necessary fixed points for the wheels and levers hereinafter referred to. Below the sliding piece 5 there is mounted upon the shaft 1 a loose collar 7, which allows the shaft to rotate freely, but does not itself rotate with it, and is kept in position upon the shaft by means of pins $1^a$ $1^a$. Pivoted to this loose collar 7 at $7^a$ is a bar or rack 8, also curved to an arc of the circle described from the center of the universal joint 4 and provided on its under side with teeth $8^a$, with which it gears with a toothed wheel 9, mounted on a pin $9^a$, capable of being rotated in bearings in a fixed piece $6^a$, forming part of the curved guide 6, and also fixed at its lower end to the fixed casing $6^*$. A fixed roller 10, adapted to bear upon the back of the rack 8, serves to keep the latter in gear with the toothed wheel 9.

Attached to or forming one with the toothed wheel 9 and coaxial therewith is a crank or disk 11, provided with a laterally-projecting crank-pin 12. An axle 13, mounted in the fixed part $6^a$, serves as the fulcrum of a bent lever 14 $14^a$. The upper part 14 of this lever 14 $14^a$ is formed with a longitudinal slot or groove 15, in which the aforesaid crank-pin 12 on the crank or disk 11 engages with a working fit. The lower part $14^a$ of the lever 14 $14^a$ is connected at its end either direct or through convenient intermediate gear, as the rod 23, to a suitable electric resistance-switch or other suitable starting, stopping, or speed-regulating mechanism, (represented by the box 24, Fig. 3,) the arrangement of the parts being such that on rotation of the crank or disk 11 the crank-pin 12 will operate to rock the lever 14 $14^a$ about its pivot 13, whereby the lower part $14^a$ of the lever will act to move the switch to a corresponding extent to cut out more or less resistance from the path of the propelling-current.

The position of the parts for stopping—that is to say, in which the resistance-switch cuts off the current entirely from the propelling-motor—is indicated by the dash-dotted lines in Fig. 1 and in full lines in Fig. 3 and is preferably arranged to be slightly behind the vertical position. The position of the parts for full-speed ahead is shown in full lines in Fig. 1. The full-astern position is indicated by the line A.

In moving the steering head and shaft 1 from the stopping position into the forward direction the rack 8, connected to the collar 7 on the shaft, is caused to rotate the toothed wheel 9, and consequently also the crank or disk 11, which acts by means of the crank-pin 12 and lever-slot 15 to move the lower part $14^a$ of the lever 14 $14^a$ from its position shown in dash-dotted lines in Fig. 1 backward into the position shown in full lines in such figure, during which movement the part $14^a$ operates the electric resistance-switch aforesaid to cut out more and more resistance, and thus increase the supply of propelling-current to the car-motor. On the steering head and shaft 1 being returned from the full-ahead position into the stopping position the action of the mechanism is the reverse of that just described, the rack 8 serving to rotate the wheel 9 and crank or disk 11 in the opposite sense, so that the lever part $14^a$ operates the resistance-switch to include an ever-increasing resistance into the path of the propelling-current until the latter is cut off altogether, when the parts are in the stopping position shown in dash-dotted lines in Fig. 1.

To reverse the direction of motion of the car, the steering head and shaft 1 are pulled still farther toward the rear of the stopping position, whereby the direction of the current is reversed by means of a suitable reversing-switch (not shown) or mechanism (represented by the box 25, Fig. 3) adapted to be operated by the shaft 1 striking a spindle 16, (part only of which is shown in Fig. 1,) which is connected in any suitable manner to the reversing-switch, or by the lever striking a cam and displacing it laterally against the pressure of a spring, the current which has been cut off in the stopping position being switched on again by means of the lever part 14$^a$, which is caused by the crank action of the pin 12 in rotating backward past the stopping position shown in dash-dotted lines in Fig. 1 to move forward again, so as to operate the resistance-switch to switch on the current again.

The steering head and shaft and connected parts are arranged to be locked in the stopping, reversing, and full-ahead positions and in any intermediate position by means of a locking device adapted to be worked by a handle 17 like that of a bicycle-brake. This handle 17 will only be used when it is required to alter the speed or to start, stop, or reverse. The handle 17 is pivoted to the steering-head 2 and is jointed to a connecting-rod 18, attached at its lower end to a flanged or grooved collar 19, adapted to be slid down along the shaft 1 in opposition to a spring 21, but turning with the shaft by means of a pin and slot or other suitable device. Fitting freely in the groove or space between the flanges of the collar 19 is a circular strap 20, which is connected to a pin 21$^a$, jointed at its other end to a spring catch or pawl 22, having a tendency to engage in retaining-notches 6$^b$, formed in the fixed guide-piece 6, and thereby lock the part 5 in any position forward or backward of the steering-head 2. The latter while being prevented from being moved unintentionally forward or backward is, however, capable of being rotated about its own axis for the purpose of steering. On pressing the handle 17 toward the steering-head 2 the collar 19 is moved down in opposition to the spring 21, thereby moving the spring-catch 22 out of the notches in the guide 6, and thus releasing the part 5, whereupon the steering-head 2 can be moved backward and forward, as desired.

Referring now more particularly to the motor-car illustrated in Figs. 3 and 4, the fixed guide 6 is shown fixed to the floor or casing 6* of the car, in front of the driver's seat, so that the steering-head 2 is brought within convenient reach of the driver. The lower part 14$^a$ of the lever 14 14$^a$ is connected at its end through the connecting-rod 23 to the electric resistance-switch (not shown) inclosed in the box 24. The spindle 16 is connected at its rear end to the reversing-switch (not shown) inclosed in the box 25. The position of the parts for stopping is shown in full lines. The full-astern position is indicated by the line A and the full-ahead position by the line B.

The lower end of the vertical spindle 1 has fixed on it a lever 26, formed with a slot 27, in which engages a pin 28, fixed on a connecting-rod 29. This rod 29 is connected at its ends to the respective steering-levers 30 30 of the front or steering road-wheels 31 31 of the car, which are pivoted on the axle 32. The full lines show the position of the parts for traveling straight ahead. By rotating the steering-head 2, by means of its handles 3 3, to the right into the position C C or to the left into the position D D the wheels 31 31 will be turned into the corresponding position $c\,c$ or $d\,d$, thus steering the car in the required direction.

In the case of the horizontal-sliding wheel for operating the locking device the arrangement will be similar to that described, with the exception that as the motion is imparted directly to the rod 18 the notches 6$^b$ must be placed on the upper surface of the guide 6.

It will be seen that my invention provides a combined steering and motion-controlling device in which a head has a rotary motion around a fixed axis and a to-and-fro motion transversely of such axis, that a flexible or universal joint for permitting either motion independently of the other is provided, that steering mechanism and speed regulating and controlling mechanism (the shaft 1 representing the former and the lever 14 representing the latter in the construction shown) are connected to the head, the one to be operated by one of its motions and the other by the other of its motions and the one at one side of and the other at the other side of said joint, that means are provided for varying the proportion of movement of the speed-regulating mechanism relatively to the movement of the head at different positions of the latter, and that by my improvements the direction of movement of the head can be utilized to cause a similar direction of movement of the speed-regulating or driving mechanism of a vehicle.

It will be understood that I do not limit myself to the particular details of construction, arrangement, or combination set forth as the preferred embodiment of my invention, since any other suitable or equivalent devices, arrangements, or combinations can be employed for carrying out my improvements and performing the functions performed by the several parts shown in the drawings without departing from the spirit of the invention.

In applying the invention to cases where a simple to-and-fro movement is necessary for controlling the speed-regulating device the rack and cog-wheel will be dispensed with and the rod 8 connected to the regulating mechanism by means of suitable links.

I have described herein the best method at present known to me of separating the to-and-fro from the rotary movements of the controlling-head; but it is evident that mechanism other than that herein described may be used for that purpose without departing from the scope of my invention, provided always that the parts transmitting the separated motions are connected to the other mechanisms described in the manner set forth in this specification.

I am aware that it has been proposed to use for other purposes, in connection with vehicles propelled by human and mechanical power, a head or handle capable of to-and-fro movement and of rotary movement. I therefore make no general claim to the use of such head or handle, but only to its special use for the purposes and in the manner producing the novel result and combination herein described.

I am aware that the use of a single handle for controlling both the speed-regulating and steering mechanism of motor-carriages or launches is not new so far as relates to movement of the handle in two intersecting planes, and I make no general claim to the use of a single handle.

What I claim, and desire to secure by Letters Patent, is—

1. In a motor-car, launch or the like, the combination with steering mechanism therefor, and speed-regulating mechanism therefor, of a head having a rotary motion on an axis, and a backward-and-forward motion laterally of said axis, a mechanical connection between said steering mechanism and said head operated by its rotary motion and operating said steering mechanism, and a mechanical connection between said head and said speed-regulating mechanism operated by the backward-and-forward motion of the head, and throwing said regulating mechanism to the advancing position with forward movement of the head and toward the stopping position with backward movement thereof, whereby the actual change of direction and velocity in the movement of said car, launch or the like, correspond with the direction and extent of movement of said head, substantially as and for the purpose set forth.

2. In a motor-car, launch or the like, the combination with a steering mechanism therefor, and speed-regulating mechanism therefor, of a head having a rotary motion on an axis, and a backward-and-forward motion laterally of said axis, a mechanical connection between said steering mechanism and said head operated by its rotary motion and operating said steering mechanism, and a mechanical connection between said head and said speed-regulating mechanism operated by the backward-and-forward motion of the head, and throwing said regulating mechanism to the advancing position with forward movement of the head and toward the stopping position with backward movement thereof, whereby the actual change of direction and velocity in the movement of said car, launch or the like, correspond with the direction and extent of movement of said head, a lock retaining said head in position, and means for operating said lock.

3. For motor-cars, launches and other devices, a combined steering and speed-regulating apparatus, consisting of a head having a rotary motion on an axis, and a to-and-fro motion laterally thereof, steering mechanism connected to said head and operated by one of said motions thereof, and speed-controlling mechanism connected to said head and operated by the other of said motions thereof, substantially as and for the purpose set forth.

4. For motor-cars, launches and other devices, a combined steering and speed-regulating apparatus, consisting of a head having a rotary motion around an axis and a to-and-fro motion laterally thereof, a flexible joint carried by said head, and steering mechanism and speed-controlling mechanism connected to said head, the one at one side of, and the other at the other side of, said joint, and the one operated by the rotary motion and the other operated by the to-and-fro motion of the head, substantially as set forth.

5. For motor-cars, launches and other devices, a combined steering and speed-regulating apparatus, consisting of a head having two motions, steering mechanism connected to said head and operated by one of its motions, speed-regulating mechanism operated by the other of the motions of said head, and a mechanical connection between said speed-regulating mechanism and said head, operating the former with the movement of the latter and differentially relative thereto at different points in such movement.

6. In a combined steering and speed-regulating apparatus for a motor-car, launch or the like, the combination with an approximately vertical steering-shaft having a universal joint and a head whereby said shaft is rotated and also moved forward and backward, of a rack moving forward and backward with said shaft, a toothed wheel engaging with said rack and receiving rotary motion therefrom, a crank-pin on said wheel and a lever operated by said pin and connected with the power-regulating apparatus of said car, launch or the like, whereby the forward-and-backward movement of said shaft is transmitted to said power-regulating apparatus and the velocity of said car, launch or the like proportionately changed substantially as set forth.

7. In a motor-car, launch or the like, the combination with starting, stopping, and speed-regulating mechanism, and steering mechanism, of a single connecting-rod or its equivalent operating said starting, stopping and speed-regulating mechanism, a single connecting-rod or its equivalent operating said steering mechanism, and a controlling head or handle movable forward and backward and rotative in approximately the same horizontal plane, and means separating the movements of said head and transmitting each independently of the other, said first-mentioned rod attached to the means transmitting the to-and-fro motion, and said second-mentioned rod being attached to the part transmitting the rotary movements of said head, substantially as and for the purpose described.

8. In a motor-car, launch or the like, the combination with starting, stopping and speed-regulating mechanism, and steering mechanism, of a single connecting-rod or its equivalent operating said starting, stopping and speed-regulating mechanism, a single connecting-rod or its equivalent operating said steering mechanism, and a controlling head or handle movable forward and backward and rotative in approximately the same horizontal plane, and means separating the movements of said head and transmitting each independently of the other, said means consisting of a lower vertical shaft controlling the steering mechanism, a universal joint connected to said shaft, and an approximately vertical shaft connected to said joint and carrying said head, guides for the latter shaft permitting it to move forward and backward and to revolve, said first-mentioned connecting-rod attached to the last-mentioned shaft and operated by its forward-and-backward movements independently of its rotary movements, substantially as and for the purpose described.

9. In a combined steering and regulating apparatus for a motor-car, launch or the like, the combination with power-regulating apparatus of an approximately vertical steering-shaft having a universal joint, and a head whereby said shaft is rotated and moved forward and backward, a rack receiving forward-and-backward motion from said shaft, a toothed wheel engaging with said rack and revolved thereby, a crank-pin on said wheel, a lever operated by said pin and connected with said power-regulating apparatus and transmitting to it the forward-and-backward movement of said shaft for proportionately changing the velocity of a car, launch or the like.

In witness whereof I have hereunto signed my name in the presence of two subscribing witnesses.

ARTHUR PAGET.

Witnesses:
JOHN C. NEWBURN,
GEORGE C. BACON.